United States Patent
Joy et al.

(10) Patent No.: US 7,317,734 B2
(45) Date of Patent: *Jan. 8, 2008

(54) METHOD AND APPARATUS FOR EMULATING ETHERNET FUNCTIONALITY OVER A SERIAL BUS

(75) Inventors: Joseph M. Joy, Redmond, WA (US); Arvind Murching, Issaquah, WA (US); Lawrence R. Cleeton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 597 days.

This patent is subject to a terminal disclaimer.

(21) Appl. No.: 11/034,744

(22) Filed: Jan. 14, 2005

(65) Prior Publication Data

US 2005/0157732 A1    Jul. 21, 2005

Related U.S. Application Data

(63) Continuation of application No. 09/769,438, filed on Jan. 26, 2001.

(51) Int. Cl.
    *H04L 12/56* (2006.01)
(52) U.S. Cl. .................. 370/466; 370/421; 370/463; 710/11; 710/105
(58) Field of Classification Search ............. 370/392, 370/419–421, 463, 466, 467; 710/105, 11
    See application file for complete search history.

(56) References Cited

U.S. PATENT DOCUMENTS

| | | | |
|---|---|---|---|
| 5,774,695 A | 6/1998 | Autrey et al. ............... 703/26 |
| 5,845,152 A | 12/1998 | Anderson et al. ............ 710/52 |
| 5,911,059 A | 6/1999 | Profit, Jr. ..................... 703/23 |
| 5,938,735 A | 8/1999 | Malik ........................... 709/238 |
| 5,953,511 A | 9/1999 | Sescila, III et al. ......... 710/315 |
| 5,978,902 A | 11/1999 | Mann .......................... 712/227 |
| 5,991,520 A | 11/1999 | Smyers et al. .............. 710/100 |
| 6,088,364 A | 7/2000 | Tokuhiro ..................... 370/466 |
| 6,094,530 A | 7/2000 | Brandewie ................... 717/127 |

(Continued)

OTHER PUBLICATIONS

G. Hoffman et al., IEEE 1394: A Ubiquitous Bus, COMPCON '95, Mar. 5, 1995, pp. 1-9, www.skipstone.com/comcon.html.

(Continued)

*Primary Examiner*—John Pezzlo
(74) *Attorney, Agent, or Firm*—Banner & Witcoff, Ltd.

(57) ABSTRACT

Applications can transparently use a bus, such as the IEEE-1394 serial bus, as if it were an Ethernet (IEEE 802.3). In a conventional Ethernet, each node is assigned a unique 6-byte MAC address in order to receive frames addressed to it over the LAN. According to the invention, IEEE-1394 bus node identifiers are mapped to Ethernet MAC addresses using for example a digital signature algorithm. Ethernet frames are then "wrapped" into 1394 bus packets and addressed to the destination node using the hashed address. The receiver unwraps the 1394 packet and restores the Ethernet frame to its original form. An optimum packet size for transmission of Ethernet packets over the 1394 bus is selected with reference to speed topology maps in the 1394 bus nodes, and this optimum size is transmitted to bus nodes. This packet size is reported to TCP to specify the packet size, and all packets larger than that size are fragmented and reassembled at the receiving node. The protocol works transparently across networks that are linked via bridges.

8 Claims, 9 Drawing Sheets

U.S. PATENT DOCUMENTS

| | | | |
|---|---|---|---|
| 6,134,662 A | 10/2000 | Levy et al. | 726/11 |
| 6,219,697 B1 | 4/2001 | Lawande et al. | 709/221 |
| 6,266,729 B1 | 7/2001 | Leung et al. | 710/313 |
| 6,272,581 B1 | 8/2001 | Leung et al. | 710/313 |
| 6,279,123 B1 | 8/2001 | Mulrooney | 714/35 |
| 6,347,337 B1 | 2/2002 | Shah | 709/224 |
| 6,353,898 B1 | 3/2002 | Wipfel et al. | 370/244 |
| 6,374,399 B1 | 4/2002 | Mann | 717/127 |
| 6,378,000 B1 | 4/2002 | Akatsu et al. | 709/245 |
| 6,430,635 B1 | 8/2002 | Kwon et al. | 710/104 |
| 6,434,117 B1 | 8/2002 | Momona | 370/236 |
| 6,496,509 B1 | 12/2002 | Fant | 370/400 |
| 6,496,862 B1 | 12/2002 | Akatsu et al. | 709/245 |
| 6,522,654 B1 | 2/2003 | Small | 370/400 |
| 6,538,758 B1 | 3/2003 | Ikegawa | 358/1.13 |
| 6,600,756 B1 | 7/2003 | Haviland | 370/468 |
| 6,658,512 B1 | 12/2003 | Gokulrangan | 710/117 |
| 6,701,371 B1 | 3/2004 | Lee | 709/231 |
| 6,725,311 B1 | 4/2004 | Joy et al. | 710/305 |
| 6,751,221 B1 * | 6/2004 | Saito et al. | 370/392 |
| 2002/0133632 A1 | 9/2002 | Salloum | 709/253 |
| 2002/0141418 A1 | 10/2002 | Ben-Dor et al. | 370/398 |
| 2003/0078063 A1 | 4/2003 | Legallais et al. | 455/509 |
| 2003/0217220 A1 | 11/2003 | Lee et al. | 710/313 |

OTHER PUBLICATIONS

IEEE std 1394-1995, IEEE Standard for a High Performance Serial Bus, 1996, pp. 1-45.

Arun Ayyagari et al., "IEEE 802.11 Quality of Service", white paper, Mar. 2000, 10 pages.

The Promoters of the 1394 Open HCI, "1394 Open Host Controller Interface Specification", Sep. 29, 1997, pp. 1-168.

* cited by examiner

METHOD AND APPARATUS FOR EMULATING ETHERNET FUNCTIONALITY OVER A SERIAL BUS

RELATED APPLICATION

This application is a continuation of prior U.S. application Ser. No. 09/769,438, filed Jan. 26, 2001, the contents of which are incorporated herein by reference.

TECHNICAL FIELD

The present invention relates generally to encapsulating and transmitting data packets over a communication network such as a serial bus. More particularly, the invention provides a method and apparatus for emulating Ethernet functionality over a serial bus such as an IEEE 1394-compliant bus.

BACKGROUND OF THE INVENTION

The well-known Ethernet protocol (IEEE 802.3) provides a method of transmitting data packets over a local area network. Ethernet packets are transmitted on a cable without pre-arranged scheduling, such that collisions may occur on the cable. The protocol includes mechanisms for detecting collisions and retransmitting packets that fail to reach their destination due to a collision.

Bridges between networks allow packets to be further transmitted between nodes residing on different networks (see FIG. 4). Each data packet, referred to as a "frame" in Ethernet parlance, conforms to a well-known standard including 6-byte (48-bit) source and destination addresses embedded in a 14-octet frame header.

Each Ethernet address, referred to more generally as a Media Access Control (MAC) address, must be unique on a network in order to ensure that a given packet will arrive at the correct destination. In practice, companies that make Ethernet network cards register MAC addresses with a central authority (e.g., the IEEE) to ensure that the address of each card will be unique across all networks and will not conflict with the addresses used by any other card, even if made by a different manufacturer. Consequently, it can be assured that Ethernet nodes on different networks connected by a bridge will not have the same MAC address.

It is conventional to transmit Internet Protocol (IP) packets, which rely on a different format and addressing scheme, over an Ethernet. As is conventional, IP data packets are "encapsulated" in an Ethernet frame, transmitted over an Ethernet PLAN, and "unwrapped" at the receiving node to restore the original IP packet.

FIG. 2 shows a conventional system in which IP packets are transmitted between two nodes 200 and 250 over an Ethernet PLAN. Application programs on each node (201 and 251) communicate with each other using TCP/IP protocols 202 and 252, respectively. As part of this process, an Address Resolution Protocol (ARP) 203 and 253 is used in each Ethernet node to translate 32-bit IP addresses into 48-bit MAC addresses and vice versa.

For example, when a transmitting Ethernet node transmits an IP packet to a destination IP address, the ARP protocol in the transmitting node determines the corresponding MAC address for the destination node based on the IP address, typically using a look-up table. This MAC address, along with the MAC address of the transmitting node, is stored into an Ethernet frame header, and the IP packet (including its own IP packet header) is "wrapped" into the Ethernet frame and transmitted over the network.

FIG. 3 shows the general encapsulation scheme, illustrating how an IP packet, which has its own IP source and destination addresses, is encapsulated in an Ethernet frame having Ethernet (MAC) source and destination addresses.

ARP works by broadcasting a packet containing the IP address with which the transmitting node is interested in communicating to all nodes attached to an Ethernet. Most nodes ignore the broadcast, but the ARP in the destination node responds upon recognizing that the IP address in the packet matches its own. The destination node responds with a message indicating its MAC address, which the transmitting node then uses to transmit the packet. Each node typically maintains a cache of ARP responses on the assumption that address mappings rarely change. As shown in FIG. 4, ARP also works across bridged networks, since ARP broadcasts are received by bridges that then pass them on to nodes on the bridged networks. Consequently, ARP responses may arrive from networks other than the PLAN on which the transmitting node resides.

Recently, a serial bus standard known as the IEEE 1394 bus has been developed. Implementations of this bus are based on the internationally adopted ISO/IEC 13213 (ANSI/IEE 1212) CSR Architecture Specification and the IEEE 1394-1995 Serial Bus Specification, which are publicly available documents. A typical system conforming to the IEEE 1394 standard includes a plurality of nodes that are interconnected via point-to-point links, such as cables, that each connects a single node of the serial bus to another node of the serial bus. The nodes are addressable entities that can be independently reset and identified. The 1394 bus provides both asynchronous and isochronous (time-guaranteed delivery) capabilities. The IEEE 1394 bus standard requires that each node have a 64-bit unique node identifier, which permanently identifies the node throughout its life, independent from other nodes or events on the serial bus.

Given the numerous capabilities and low cost of the IEEE 1394 bus, it is anticipated that computer systems that previously relied on Ethernet to implement network communication will be modified to use the newer IEEE 1394 bus, and/or to co-exist with the 1394 bus. A large amount of software written specifically for Ethernet and IP over Ethernet will need to be rewritten to operate using the 1394 bus, thus imposing costs and schedule delays. Consequently, one challenge arising out of moving to the newer 1394 bus implementation is figuring out how to minimize the costs associated with migrating Ethernet-based systems to a 1394-based implementation.

Various implementations of the IEEE 1394 bus in computer systems typically include layered hardware and software support based on transaction, link, and physical layer protocols. The publicly available IETF Request for Comments (RFC) 2734 describes a scheme for using the 1394 bus to transmit IP datagrams. The document generally refers to transmitting specific IP flows over isochronous channels of the IEEE 1394 bus. However, it does not suggest emulating Ethernet functionality using the IEEE 1394 bus.

A company known as Unibrain has advertised a proprietary Ethernet software emulation product, referred to as FireNet™, which purportedly emulates unique Ethernet addresses by setting Ethernet addresses to be based on the IEEE-1394 address that was assigned to the IEEE-1394 board.

One problem that arises when considering the use of an IEEE 1394 serial bus to emulate Ethernet functionality relates to packet sizes. Maximum Ethernet packet sizes are fixed at about 1500 bytes, while packet sizes on the 1394 bus can vary depending on node capabilities. Certain 1394 bus nodes may have the capability of transmitting and receiving at one data rate (e.g., bytes per second), while others may only be able to communicate using lower rates. Various tradeoffs relating to packet sizes and bus speeds give rise to a more general problem: how to translate Ethernet frame sizes into the various packet sizes that can be accommodated by 1394 bus nodes.

In summary, it would be desirable to emulate Ethernet functionality over an IEEE 1394 serial bus, so that existing software already written for Ethernet interfaces can readily used without major revisions. Moreover, it would be desirable to emulate Ethernet functionality in a manner that takes advantage of various 1394 capabilities in an efficient manner.

SUMMARY OF THE INVENTION

The invention allows applications to transparently use a serial bus as if it were an Ethernet. According to one aspect of the invention, IEEE-1394 bus node identifiers are mapped to MAC addresses using a digital signature function and stored in each bus node. Each node maintains a list of mappings of MAC addresses to IEEE 1394 identifiers for all the nodes on the IEEE-1394 bus. Link-layer ARP is used to discover this mapping. When an application or protocol requests transmission of an Ethernet frame including an IP packet, the transmitting node "wraps" the Ethernet frame in a 1394 bus packet and transmits it to the target node using the node addressing information. The target node receives the packet and unwraps it to reproduce the original "Ethernet" frame.

According to another aspect of the invention, an optimum packet size for transmission of Ethernet packets over the 1394 bus is selected and broadcast to all bus nodes. The protocol works transparently across networks linked via bridges, by utilizing a bridge channel for traffic destined for nodes external to the local 1394 bus.

DETAILED DESCRIPTION OF THE INVENTION

Figure 1:
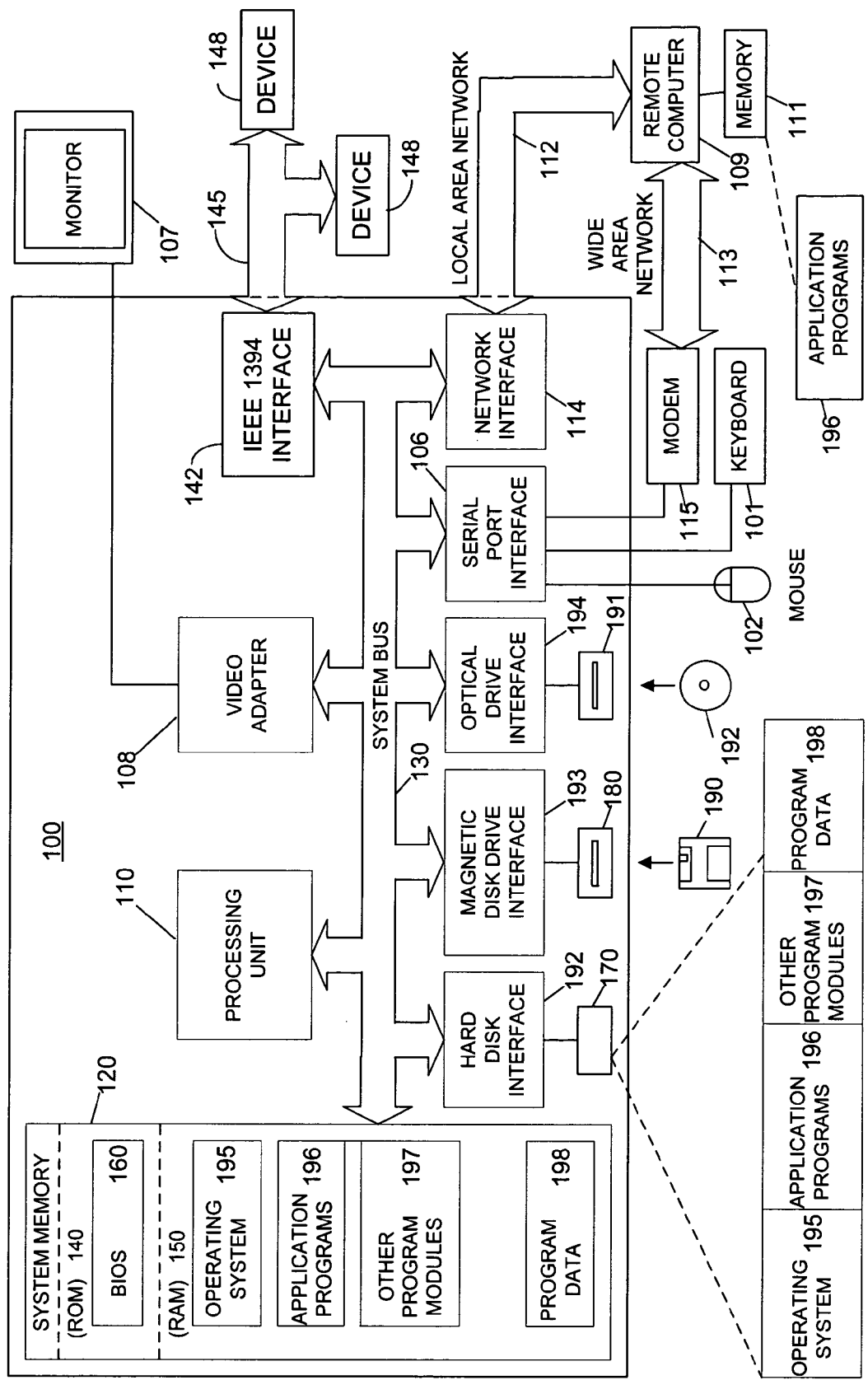
FIG. 1 is a schematic block diagram of a conventional general-purpose digital computing environment that can be used to implement various aspects of the present invention.

FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An IEEE 1394 interface 142 may also be provided. The IEEE 1394 interface 142 couples an IEEE 1394-compliant serial bus 145 to the system bus 130 or similar communication bus. The IEEE 1394-compliant serial bus 145, as known in the art, allows multiple devices 148 to communicate with the computer 100 and each other using high-speed serial channels. The IEEE 1394 serial bus standard is based largely upon the internationally adopted ISO/IEC 13213 (ANSI/IEEE 1212) CSR Architecture Specification and the IEEE 1394-1995 Serial Bus Specification. Additional buses such as the PCI bus can be provided in computer 100 and interfaced to the IEEE 1394 and other buses.

A typical serial bus having an IEEE 1394 standard architecture is comprised of a multiplicity of nodes that are interconnected via point-to-point links, such as cables, that each connects a single node of the serial bus to another node of the serial bus. The nodes themselves are addressable entities that can be independently reset and identified. Nodes are logical entities, each with a unique address. Each node provides a so-called configuration ROM (read-only memory)—hereinafter referred to as configuration memory—and a standardized set of control registers that can be accessed by software residing within the computer system.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. Procedures of the present invention to be described below can operate within the environment of the computer 100 shown in FIG. 1. Although the invention is generally applicable to a computer operating in accordance with the IEEE 1394 standard, it is not intended to be so limited.

Figure 5:
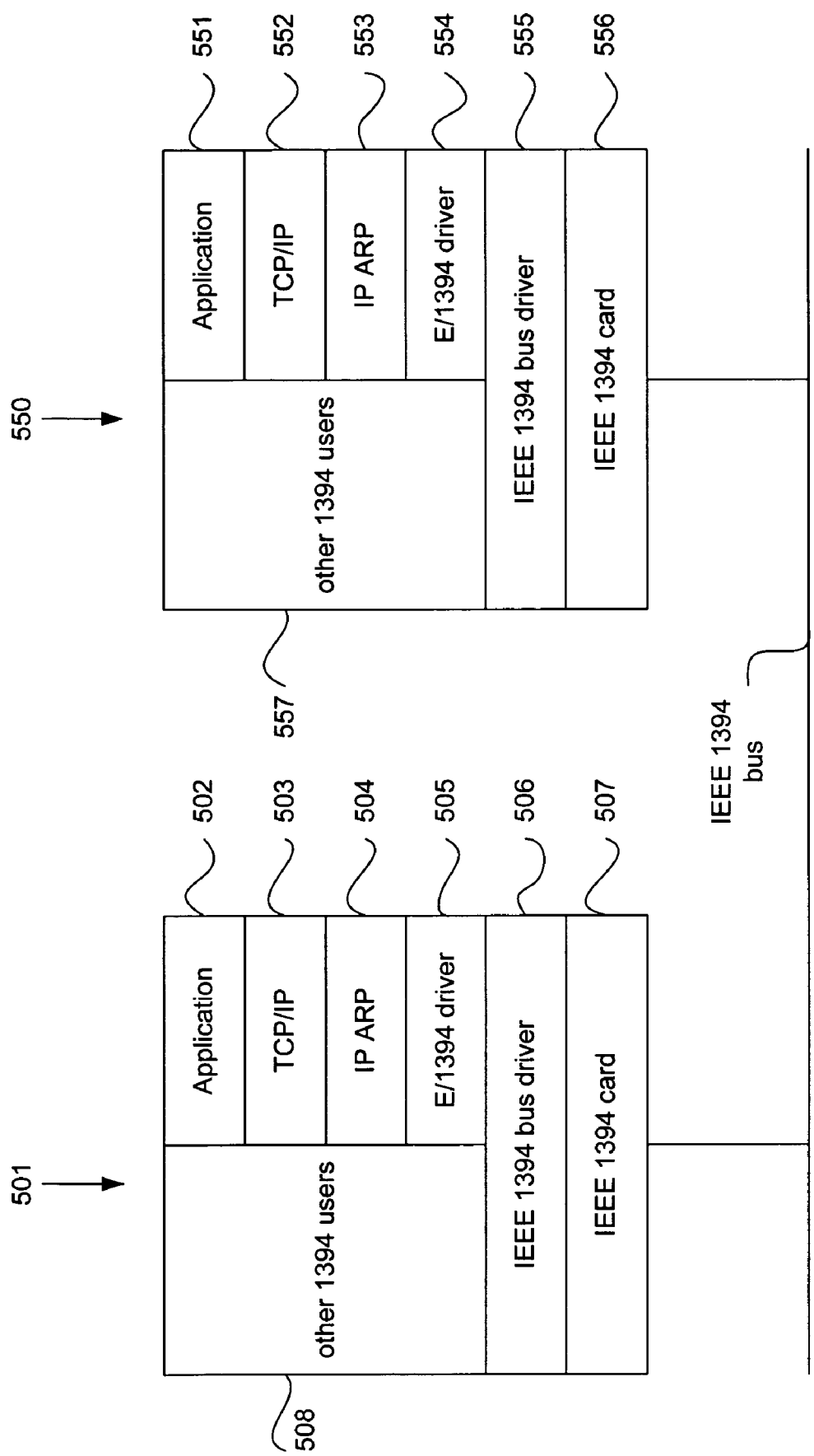
FIG. 5 shows a system employing various inventive principles to emulate Ethernet functionality using an IEEE 1394 serial bus.

FIG. 5 shows a system constructed according to one aspect of the present invention. As shown in FIG. 5, two computer nodes 501 and 550 are coupled through a serial bus such as the IEEE 1394 bus. As is conventional, each node includes a 1394 hardware card (507 and 556, respectively) and an appropriate 1394 bus driver (506 and 555, respectively) that collectively permit the nodes to communicate using the 1394 bus.

In one embodiment, each 1394-compliant bus driver comprises an Open Host Controller Interface (OHCI) driver implementation of the IEEE 1394 link layer protocol. The OHCI is described in the 1394 Open Host Controller Interface Specification, which is publicly available. This interface can transmit and receive all defined 1394 packet formats using Direct Memory Access (DMA) to write the packets into the host computer's memory. In some embodiments, virtual device drivers can be used to connect to and communicate over the bus.

Figure 2:
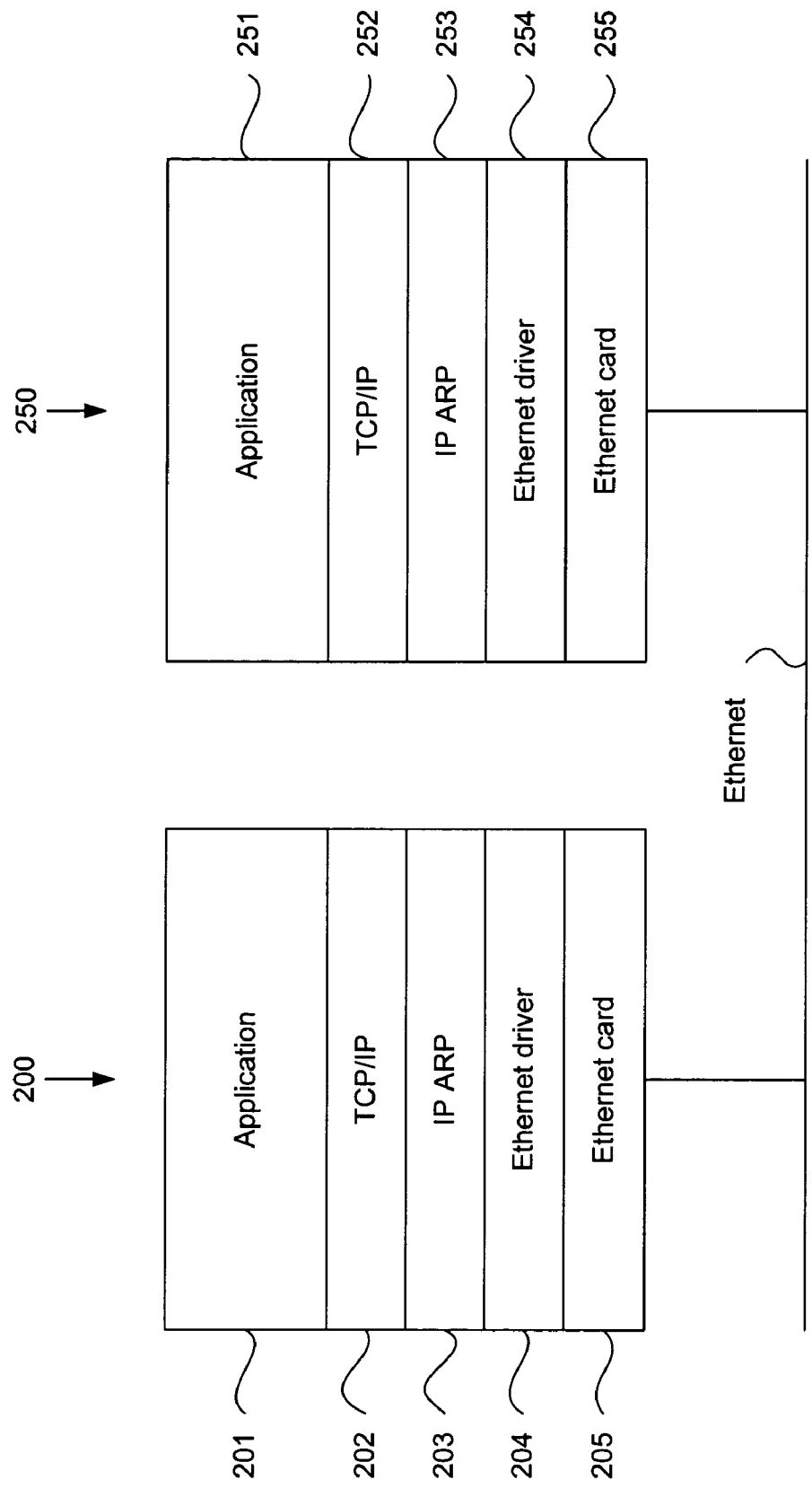
FIG. 2 shows a conventional Ethernet local area network (PLAN) in which a conventional Address Resolution Protocol (ARP) is used to map IP addresses to Ethernet MAC addresses.
Figure 3:
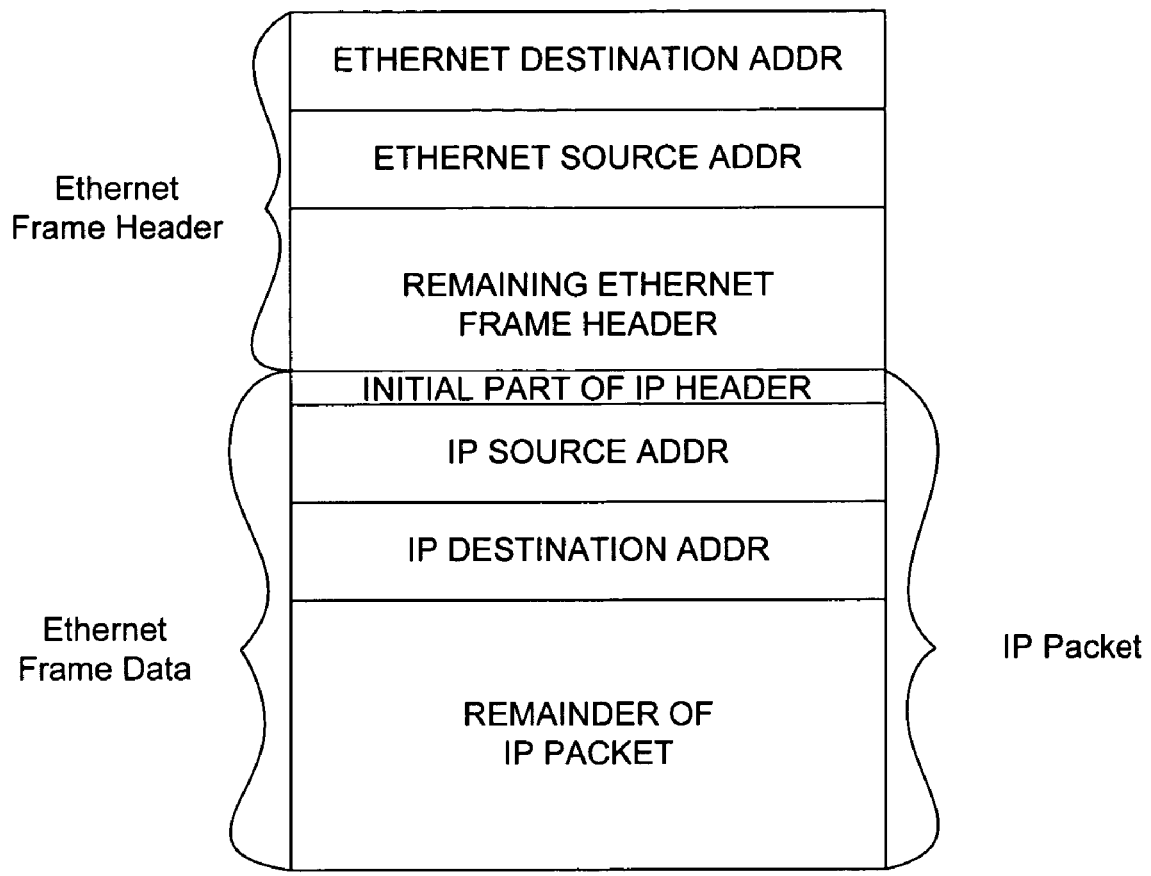
FIG. 3 shows a conventional approach for encapsulating IP packets in Ethernet frames.
Figure 4:
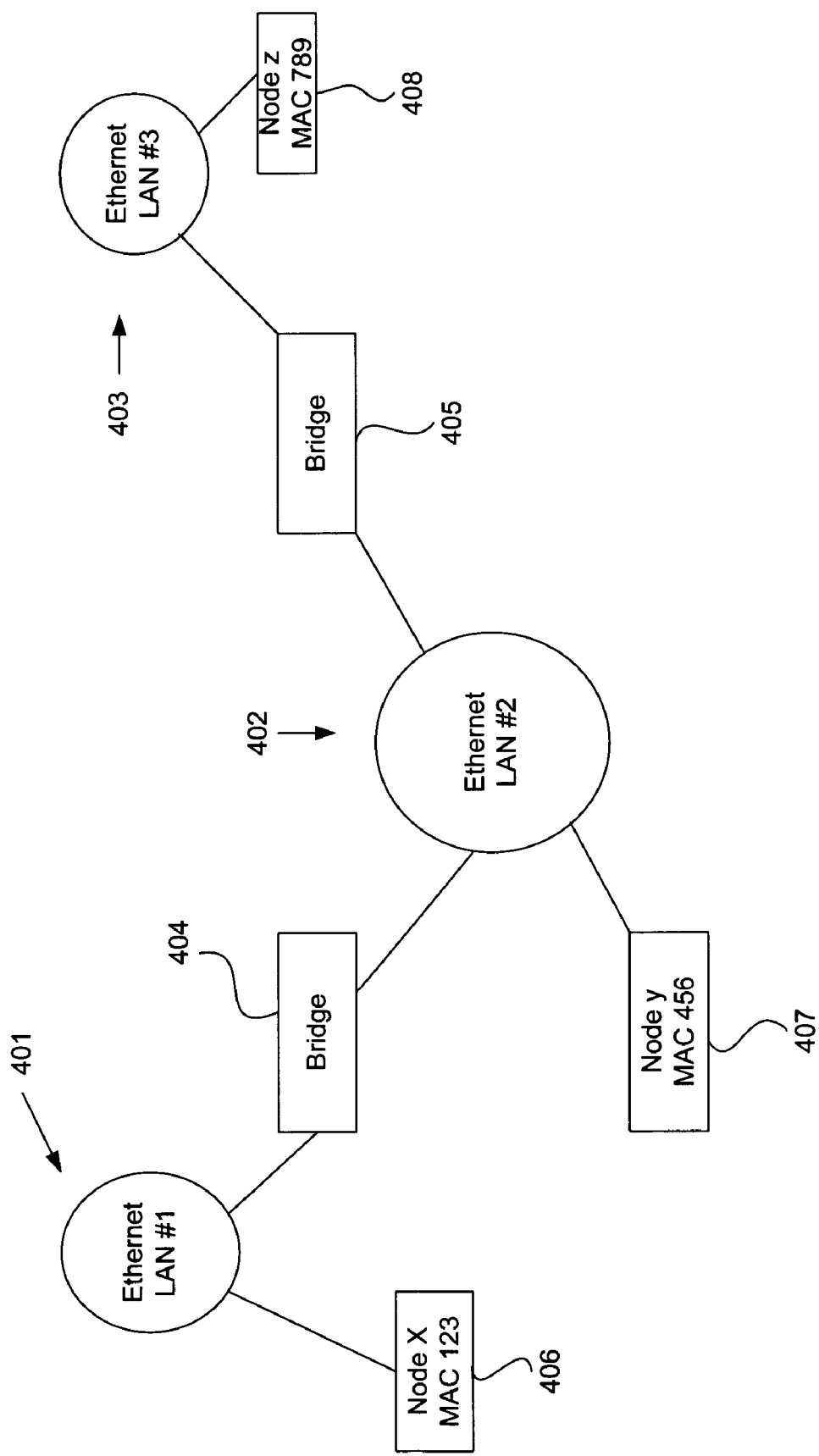
FIG. 4 shows a conventional technique for connecting local area networks using bridges, such that packets on one network can be forwarded to a destination node on another network.

As is conventional, each node can include one or more application programs (502 and 551 respectively) that operate using TCP/IP protocols 503 and 552. Also as is conventional, the TCP/IP protocols make use of an Address Resolution Protocol (ARP) 504 and 553. However, in contrast to conventional systems in which the TCP/IP and ARP software is bound to Ethernet drivers (see FIG. 2), according to the invention an Ethernet/1394 driver interface (505 and 554 respectively) is provided. These interfaces provide the same API and apparent functionality as prior art Ethernet drivers, but they emulate the functionality by translating the functions into 1394 bus operations as described in more detail herein. Consequently, the TCP/IP and ARP protocols need not be modified to operate with the 1394 bus, but can instead continue to treat packets as if they will be transmitted over an existing Ethernet LAN. In accordance with these principles, existing software can be easily used on the 1394 bus without modification. Moreover, as shown in FIG. 5, other 1394 bus users 508 can co-exist on the same node and make use of the extensive 1394 bus facilities. Consequently, some applications can transmit packets using 1394 bus protocols and facilities, while others can indirectly use the 1394 facilities by treating the 1394 bus as an Ethernet.

Figure 6:
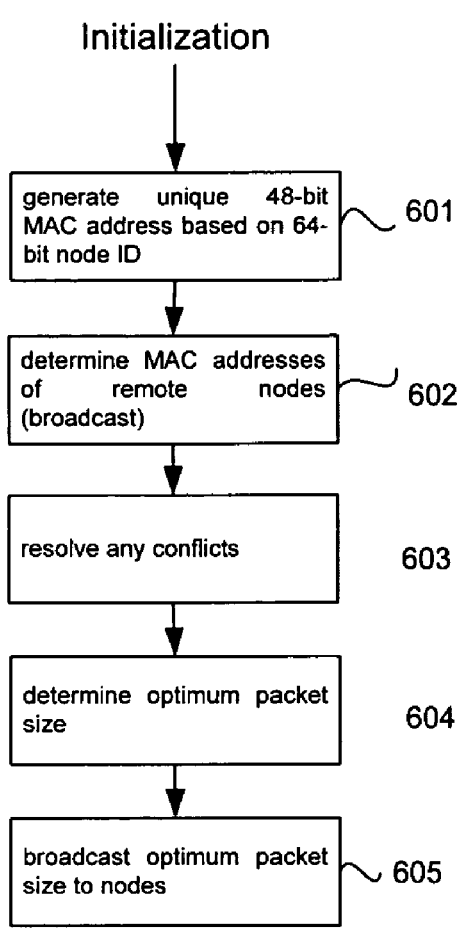
FIG. 6 shows steps for initializing Ethernet emulation functions in a 1394 bus network according to one aspect of the present invention.

FIG. 6 shows steps for initializing Ethernet emulation functions in a 1394 bus network according to one aspect of the present invention. It is contemplated that software in each bus node (e.g., the E/1394 driver interface) will execute these steps in order to configure the node to handle Ethernet emulation. The term "E/1394 node" will be used to refer to a computer node that provides Ethernet emulation over a 1394 bus.

According to one aspect of the invention, each E/1394 node is assigned a MAC address, much like an Ethernet node. Each E/1394 node should have a globally unique Ethernet MAC address, in order to permit seamless integration of an E/1394 node with other Ethernet LAN segments. There are various approaches for doing this. In one approach, devices that are shipped with an integrated E/1394 stack and 1394 controller can use a centrally-assigned (e.g., IEEE) MAC address for each device. Alternatively, a unique MAC address can be generated based on the 64-bit node ID. In yet a third approach, a user may directly configure a MAC address for each 1394 node.

Step 601 of FIG. 6 assumes that a node ID to MAC address mapping scheme is used. As shown in step 601, a unique 48-bit MAC address is generated based on the 64-bit node identifier assigned to the node.

Figure 10:
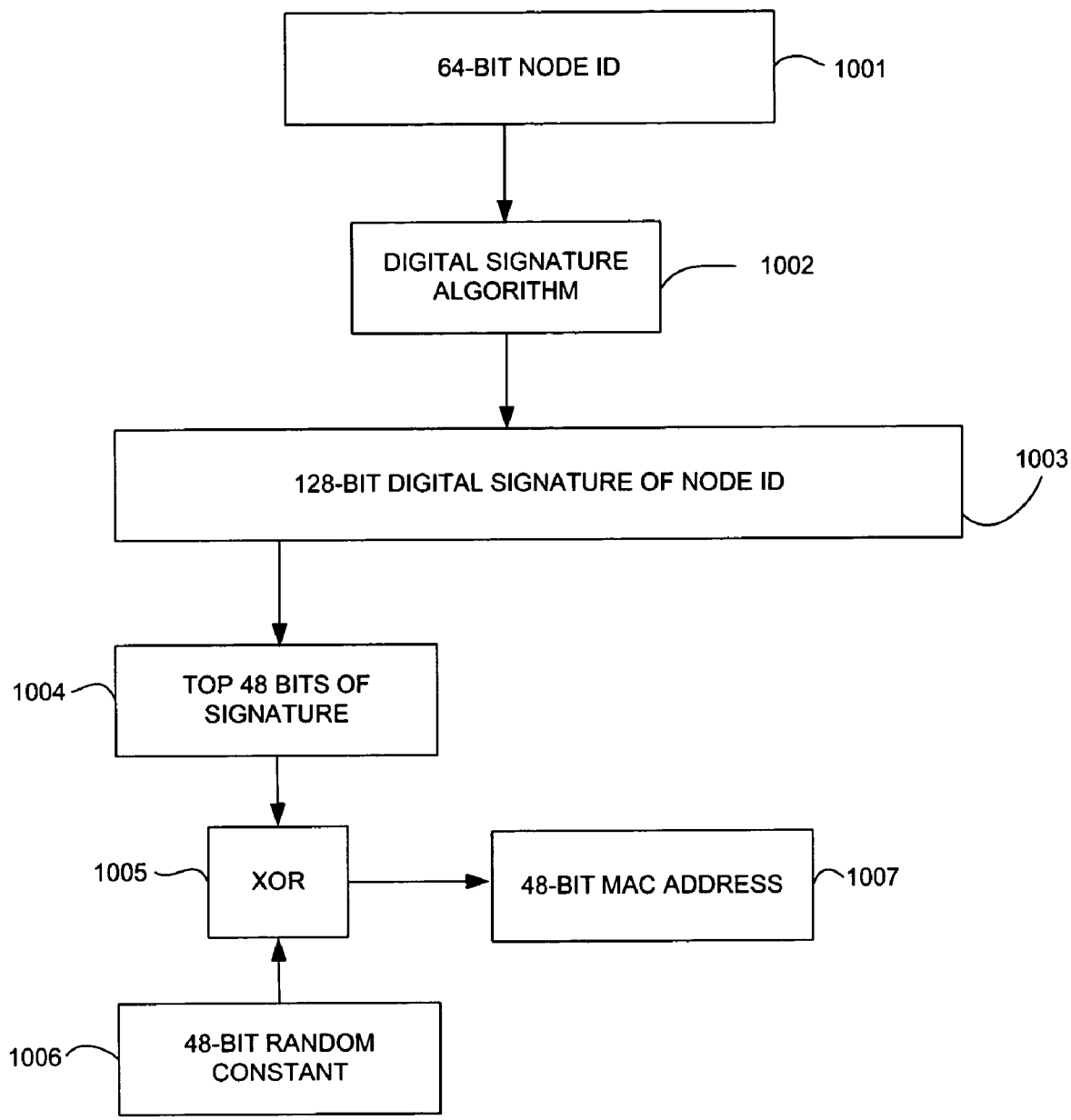
FIG. 10 shows one possible method of converting a 64-bit node UID into a 48-bit MAC address.

FIG. 10 shows one possible approach for creating a 48-bit MAC address based on a 64-bit node identifier. A 1394 node identifier 1001 comprises 64 bits, including a 2-byte vendor ID, a 2-byte model ID, and a 4-byte serial number. An Ethernet MAC address 1007, on the other hand, consists of 48 bits (including a 3-byte vendor ID or "Organizationally Unique Identifier," and a 3-byte serial number). In both cases, the vendor IDs are assigned or registered with a central authority (e.g., the IEEE), while the serial number is determined by each vendor. The combination of vendor ID and other fields thus renders the identifiers unique in each case.

According to one variation of the invention, 64-bit node IDs are used to create 48-bit MAC addresses using a technique that minimizes the possibility of an address conflict (i.e., the possibility that two MAC addresses generated would conflict with a previously used MAC address). According to this variation, the 64-bit node ID is input to a digital signature algorithm 1002, such as the well-known MD5 algorithm (documented in the IETF's RFC 1321), thus producing a 128-bit digital signature of the node ID 1003. Next, the first 48 bits of this signature 1004 are extracted, and are then fed into an exclusive OR operation 1005.

The other input to the XOR operation is a randomly-generated 48-bit constant 1006, which could form part of an Ethernet-over-1394 protocol specification. The purpose of the XOR operation is to reduce the likelihood that the generated MAC address would conflict with some other scheme for generating MAC addresses from the 64-bit node identifier. A proposed constant is: 0xDE 0xE4 0xED 0xB8, which was generated by coin-tossing. Finally, the 48-bit pattern is converted into a valid Ethernet MAC address by setting the "locally administered" bit and clearing the "multicast bit." The resultant MAC address 1007 represents a 46 bit hash of the original 64-bit node identifier.

According to another embodiment, each vendor can create its own unique MAC address (e.g., for an Ethernet-enabled printer). A central allocation authority such as the IEEE can act as a registration facility to ensure that unique MAC addresses are created, even though they will technically not be used for Ethernet purposes (i.e., they will be used for Ethernet emulation purposes). This approach might run into difficulties where personal computers are concerned, since the vendor for the PC may be different from the vendor for a 1394 adapter card, leading to difficulties in ensuring unique addresses. After a MAC address is generated, it is reported to the TCP/IP protocol layers as is conventional.

Returning to FIG. 6, in step 602 the MAC-to-1394 node-specific mapping information for all nodes is learned. One method of doing this is to broadcast a request for this information, to which the other nodes respond. Another method is to read the configuration ROM (CROM) of nodes on the bus. According to one embodiment, the MAC-to-1394 node mapping information maps a MAC address to a UID and address offset, and this information is stored in the node in a table or other data structure.

Various MAC address generation schemes outlined above leave a small but finite possibility that two identical MAC addresses could be created. Accordingly, in certain embodiments a conflict resolution step is also performed, as illustrated by step 603 in FIG. 6. The conflict resolution procedures, however, are optional given the small chance of a conflict (e.g., much smaller than the probability of a hardware failure). One protocol, described below, detects collisions among all E/1394 nodes in all E/1394 segments in a bridged LAN (for example, between LANs 1101 and 1103 in FIG. 11). E/1394 nodes that use IEEE-assigned MAC addresses should not participate in collision detection and resolution, with the exception that bridge nodes must forward the collision-detection traffic as described further below. This protocol also has the property that nodes newly entering a network do not knock out nodes already in the network.

In one embodiment, each E/1394 node broadcasts an initialization packet indicating its node UID and MAC address. For example, E/1394 nodes can broadcast the following packet announcing their MAC-address to node ID mapping:

```
typedef struct
{
    ETHERNET_HEADER         EthHdr; // Dest: Broadcast.
    UCHAR                   fInit:1;
    ETHERNET_MAC_ADDRESS    MacAddress;
    UCHAR                   Eu64Id[8];
} MAC_TO_HW_MAPPING_PKT;
```

The fInit field usage is defined further below. E/1394 bridge nodes, in addition to broadcasting the above packet on their E/1394 segment, should also:
  (a) Broadcast the packet on all other connected LAN segments;
  (b) Process (for collision detection) any MAC_TO_HW_MAPPING_PKTs received from other connected LAN segments before sending them out on the local E/1394 segment; and
  (c) Broadcast MAC_TO_HW_MAPPING_PKTs received on each connected E/1394 segment to other Ethernet LAN segments.

E/1394 nodes should transmit the packet under the following situations, with the specified values for the fInit field:
  (a) On initialization, 3 times, one second apart, with fInit set to 1.
  (b) In response to a conflicting MAC_TO_HW_MAPPING_PKT received from some other node, the fInit field is set to 1 for the first 10 seconds after initialization, and 0 afterwards.

To resolve collisions, a node wins a collision under the following conditions:
  (1) During the first 10 seconds of initialization, if the conflicting received packet has a numerically smaller Eu641d field AND its fInit value is 1.
  (2) After the first 10 seconds of initialization, if the conflicting received packet has a numerically smaller Eu64Id field OR its fInit value set to 1.

The node loses collision resolution otherwise. Nodes losing collision resolution should disable their network interface and not attempt to rejoin with the same MAC address. Optionally, they may save the fact that they have lost the collision resolution in persistent memory, and attempt to re-join with a different MAC address.

In step 604, the optimum packet size for transmitting Ethernet packets on the 1394 bus is determined, and in step 605 this packet size is transmitted to other nodes. In general, the 1394 bus supports nodes with heterogeneous node capabilities. Different nodes can have different maximum buffer sizes and transmission speeds. For example, the network may include one node capable of 400 mbps and 2048-byte transfer capabilities and a second node capable of only 100 mbps and 512-byte transfers. This would require capability negotiation as well as link-layer fragmentation so that a single maximum transmission unit (MTU) size can be presented to upper protocol stack layers.

The following describes one possible method for determining an optimum negotiated packet size. First, the node IDs of all Ethernet-capable nodes are identified (e.g., through the CROM or ARP). Second, the speed topology map stored in each such node is retrieved. This maps the speed that should be used for communicating with each node (e.g., 100 mbps using packet size of 512 bytes; 200 mbps using packet size of 1024 bytes; or 400 mbps using packet size of 4096 bytes). Third, the maximum speed with which any two given Ethernet-emulation compatible nodes can communicate is identified by comparing the speed topology maps. Fourth, this maximum speed is used to select the packet size (determined from the speed topology map), and all 1394 packets that emulate Ethernet packets are sent using that packet size. For example, if the maximum speed is 100 mbps, the packet size is set to 512 bytes; if the speed is 200 mbps, the packet size is 1024 bytes; if the speed is 400 mbps, the packet size is 4,096 bytes. This packet size is reported to TCP to specify the packet size; all packets larger than that size will be fragmented and reassembled at the receiver.

In general, in order to maximize efficiency, each Ethernet packet should be carried in a single 1394 bus packet. If the 1394 bus packet size for Ethernet packets is too small, then resources will be wasted on fragmentation and reassembly of bus packets. If the 1394 bus packet size for Ethernet packets is too large, then a large amount of bus packet space will be wasted. Accordingly, it is most efficient to have a match between the size of the Ethernet packet and the 1394 bus packet.

When broadcasting, however, it may be advisable to use the smallest packet size. In point-to-point communication, it may be better to use the largest packet size for communicating between the nodes.

Figure 7:
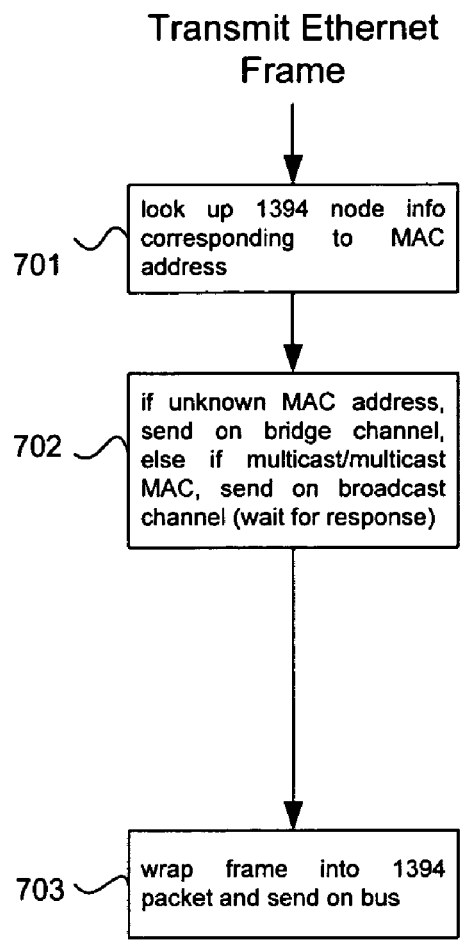
FIG. 7 shows steps for transmitting an Ethernet frame by converting it into a 1394 bus packet.

FIG. 7 shows one possible method for transmitting an Ethernet frame by converting it into a 1394 bus packet. As part of initialization, each node performs "Link Layer ARP", whereby it broadcasts the mapping from its generated Ethernet MAC address to 1394-specific information (including its 64-bit node identifier, address offset, and FIFO address) and requests other nodes to send their mappings. Using this mechanism, each node learns of mappings of Ethernet addresses to 1394-specific information for all other nodes on the 1394 network. An alternative mechanism is for each node to publish its mapping in a unit directory in its configuration ROM.

Beginning in step 701, when a packet is to be transmitted, the E/1394 driver looks up the 1394 node information corresponding to the MAC address. In step 702, if the MAC address is unknown, a request is transmitted on the bridge channel, and if a multicast address, the request is transmitted on the broadcast channel. In step 703, the frame is wrapped into a 1394 packet and transmitted on the bus to the correct 1394 bus address (packet fragmentation steps are omitted).

Traffic addressed to a non-multicast Ethernet MAC address (unicast) is, in one embodiment, transmitted on the 1394 bus using asynchronous writes to the node addressing information advertised by the link layer ARP. Traffic is sent on a designated "bridge" channel (if there is one) if no local node "owns" the MAC address. In other words, if there is no mapping from the unicast MAC address to a specific 1394 node, the traffic addressed to that MAC address is retransmitted on a dedicated "bridge" channel on the 1394 bus that is monitored by bridges for purposes of forwarding to other networks connected to the bridge (see below, with reference to FIG. 11).

Ethernet broadcast traffic is, in one embodiment, sent on the 1394 broadcast channel. Fields in the GASP header identify the packet as being Ethernet packet (see RFC 2734, above).

Ethernet multicast traffic is, in one embodiment, sent on IEEE 1394 channels using either asynchronous streaming or isochronous streaming. Unlike IP/1394, it is preferred not to send multicast data on the broadcast channel, which can instead be reserved for control-related traffic. However, the invention is not limited in this respect.

Figure 8:
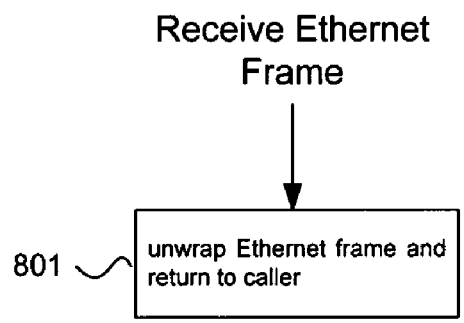
FIG. 8 shows steps for receiving a 1394 bus packet and converting it into an Ethernet frame.

FIG. 8 shows the inverse process; that is, when the wrapped Ethernet frame is received at the target node. In step 802, the 1394 packet is unwrapped and returned to the caller.

Figure 9:
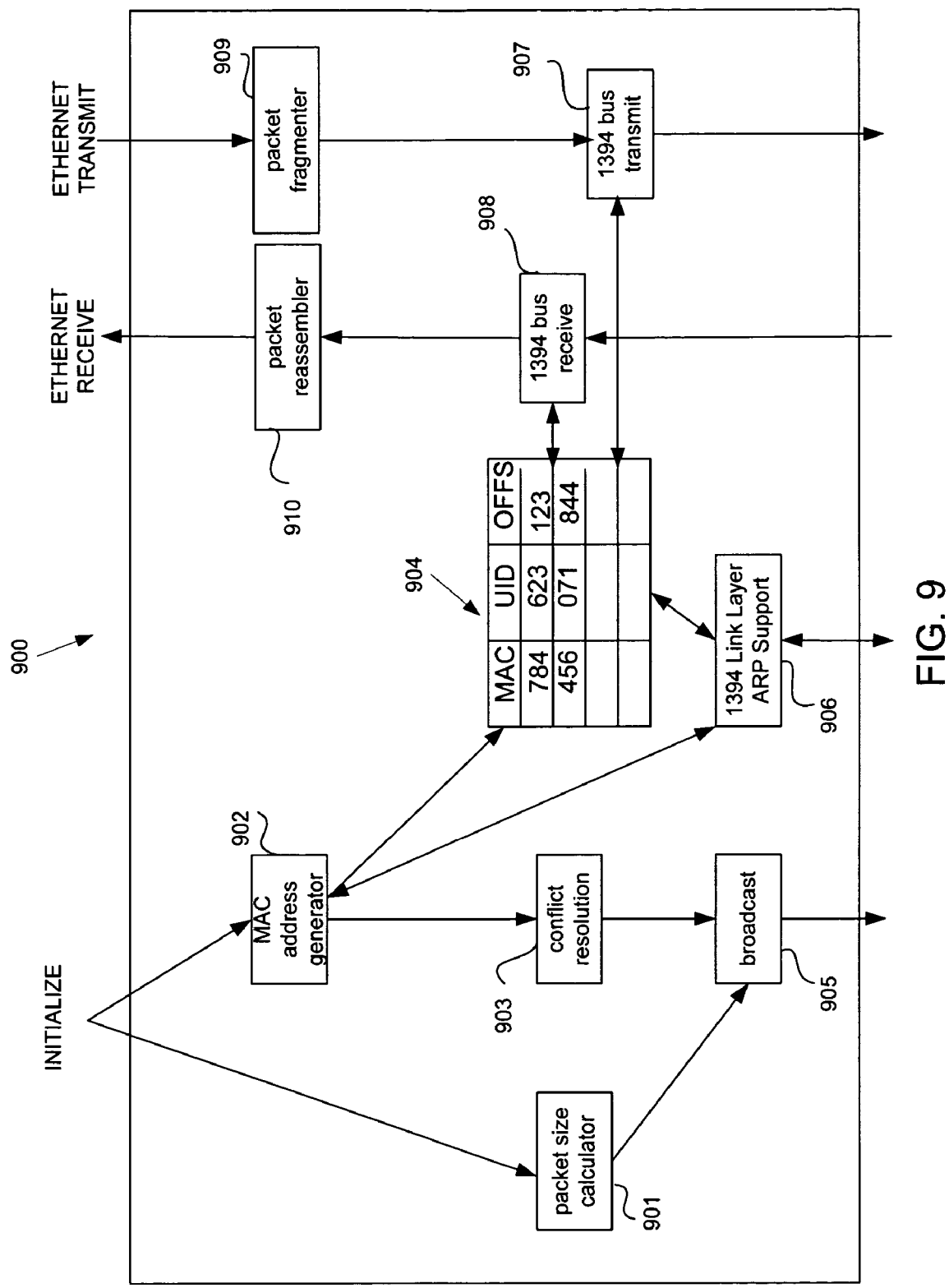
FIG. 9 shows an Ethernet/1394 bus driver including various features of the present invention.

FIG. 9 shows schematically an Ethernet/1394 bus driver 900 including various features of the present invention. As shown in FIG. 9, a MAC address generator 902 is invoked as part of an initialization function, and in various embodiments performs steps such as those described with reference to FIG. 10 to generate a unique MAC address for the node. The unique MAC address is optionally checked using conflict resolution function 903 (which uses broadcast function 905) and, assuming there are no conflicts, the MAC address is stored in address table 904.

Packet size calculator 901 is also optionally invoked as part of the initialization procedure, and calculates an optimal packet size for use in transmitting Ethernet frames on the 1394 bus (see discussion above). This packet size is broadcast over the bus using broadcast function 905. The packet size calculator is also invoked when a new node is added to the bus, because it may need to change the packet size when a new node is added.

The 1394 link layer ARP module 906 builds the look-up table 904 that maps Ethernet MAC addresses to 1394-specific information such as 64-bit unique ID and FIFO-address offset. This table is kept up-to-date each time a node is added or removed.

Ethernet transmit requests are handled by 1394 bus transmit function 907, which performs for example the steps described in FIG. 7 (e.g., wrapping Ethernet frames into 1394 bus packets, looking up the 1394-specific information such as FIFO address offset from the address table 904, and transmitting them). Similarly, 1394 bus receive function 908 performs for example the steps described with reference to FIG. 8 (e.g., unwrapping Ethernet frames and returning them to the intended recipient).

Packet fragmenter 909 breaks up Ethernet packets into smaller 1394 bus packets if necessary using the optimum bus packet size. Similarly, packet reassembler 910 reassembles broken up packets into one Ethernet frame as necessary. Packet fragmentation and reassembly operations per se are conventional.

Figure 11:
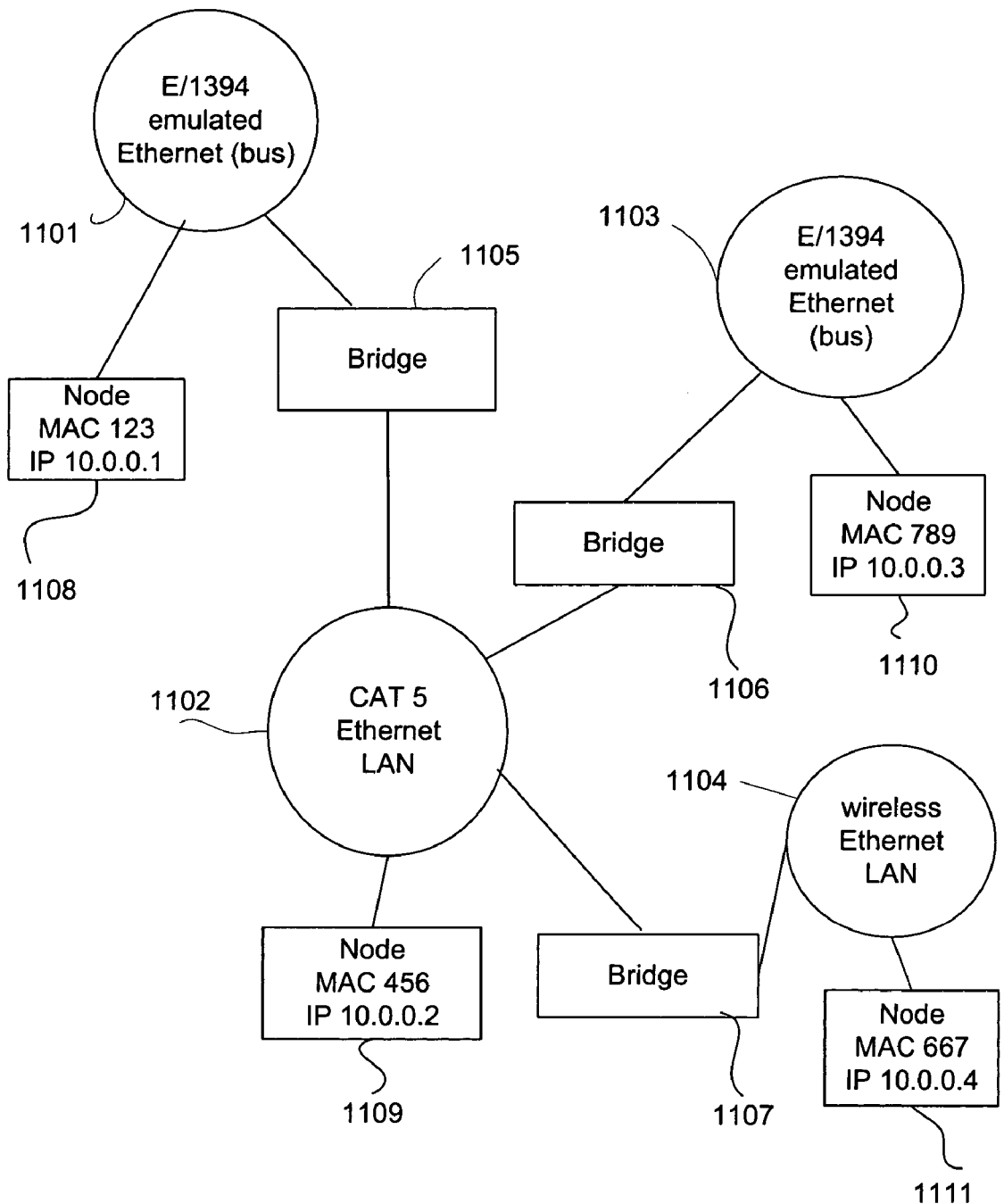
FIG. 11 shows how four different local area networks can be integrated into one virtual LAN using bridges, wherein one or more of the networks are an emulated Ethernet implemented on an IEEE 1394 serial bus.

FIG. 11 shows how four different local area networks can be integrated into one virtual LAN using bridges, wherein one or more of the networks is an emulated Ethernet implemented on an IEEE 1394 serial bus. As shown in FIG. 11, a first network 1101 comprises an E/1394 network; that is, a 1394 serial bus including nodes having Ethernet emulation capabilities. Node 1108 on this network includes for example an emulated MAC address of 123 and IP address of 10.0.0.1. Network 1101 is coupled to network 1102 via bridge 1105. Network 1102 may comprise, for example, a CAT 5 Ethernet LAN including a node 1109 having a real MAC address of 456 and IP address of 10.0.0.2.

Network 1102 is further coupled to networks 1103 and 1104 via bridges 1106 and 1107. Network 1103 may comprise, for example, an E/1394 emulated Ethernet LAN (e.g., including one or more Ethernet-emulated nodes such as node 1110, having an emulated MAC address of 789 and IP address of 10.0.0.3). Network 1104 may, for example, comprise a wireless Ethernet LAN having multiple nodes including node 1111 having a real MAC address of 667 and IP address of 10.0.0.4.

In accordance with one aspect of the invention, a source node (e.g., node 1108) broadcasts an ARP request for a destination node that is located on a different network (e.g., node 1110 on LAN 1103). The bridge 1105, which monitors the broadcast channel in addition to the bridge channel, re-retransmits the request to the other networks to which the bridge is connected. The ARP on one of the other networks (e.g., network 1103) recognizes the IP address and returns its node information to the source node. If a node on the 1394 segment is requested to transmit to a unicast MAC address which is not on the 1394 segment, the packet is transmitted on a dedicated bridge channel. All bridges on the 1394 segment listen to the bridge channel, and will optionally forward the packet to other physical segments. In this fashion, Ethernet emulated networks can operate seamlessly with other networks, including real Ethernet networks. Bridges connected to the E/1394 should operate in accordance with the principles described herein, just like any other E/1394 host. By convention, bridges learn and cache source addresses that they "see" on each segment to which they are attached.

The following steps refer to FIG. 11, and illustrate an IP "ping" operation between E/1394 node 1108 and E/1394 node 1110. These nodes are on separate IEEE 1394 buses, separated by two bridges and a CAT 5 Ethernet LAN. Other cases, such as transmission between node 1108 and node 1109 are simpler cases.

Begin by assuming that E/1394 node 1108 with IP address 10.0.0.1 has never previously communicated with Node 1110 with IP address 10.0.0.3. Therefore, their IP ARP caches do not contain references to each other's IP addresses.

1. The user initiates an IP "ping 10.0.0.3" command on 1108.

2. The TCP/IP stack on 1108 tries to resolve 10.0.0.3 by broadcasting an IP ARP request. Since this node is on an E/1394 LAN, this request is encapsulated and sent over the E/1394 broadcast channel.

3. The bridge 1105 receives this request and forwards it on to the CAT 5 Ethernet LAN 1102 from where this broadcast ARP packet makes its way to all connected LANS, including the E/1394 LAN 1103.

4. The ARP packet is indicated up to all nodes on all the connected LANs, including node 1110.

5. Since Node 1110 owns address 10.0.0.3, it responds by sending an ARP reply addressed to MAC address 123 (the MAC address that originated the ARP request). The E/1394 driver on node 1110 recognizes that MAC 123 is not on the local LAN 1103 (because it uses link-layer ARP to build a table of MAC-addresses and 1394 information for all E/1394 nodes on the local 1394

Bus), so it sends the unicast IP ARP reply on the bridge channel.

6. Bridge 1106, which is listening on this channel, picks up this packet and sends it as a regular Ethernet packet on the CAT 5 Ethernet LAN 1102.

7. Bridge 1105 receives this packet, and since it recognizes MAC 123, sends the packet directly to node 1108, using the IEEE 1394 information corresponding to this MAC address—it looks up this information it its MAC-to-1394 table.

8. The IP ARP reply is indicated up to the TCP/IP stack on node 1108, which parses the IP arp reply and learns that fact that IP address 10.0.0.3 maps to MAC address 789 (the MAC address of node 1110).

9. The TCP/IP stack on node 1108 then composes and sends an ICMP ping packet to Ethernet MAC address 789. The E/1394 driver on node 1108 sends this on the bridge channel (see step 4).

10. Bridge 1105 forwards this packet to LAN 1102.

11. Bridge 1105 forwards this ICMP ping packet to Node 1110, in a manner analogous to step 7.

12. Node 1110's TCP/IP stack has now received the ICMP ping packet addressed to 10.0.0.3. It responds by composing an ICMP ping response, addressed to 10.0.0.1, the IP address of node 1108, the originator of the ping request.

13. The ping response makes its way back to node 1108 using steps analogous to steps 1 to 11, except that the direction is now reversed—node 1110 is sending a unicast IP packet addressed to 10.0.0.1, which is owned by node 1108.

14. The TCP/IP stack receives the ping response packet and the ping utility notifies the user of the successful reception of a ping response.

What has been described above is merely illustrative of the application of the principles of the present invention. Other arrangements and methods can be implemented by those skilled in the art without departing from the spirit and scope of the present invention. Any of the methods of the invention can be implemented in software that can be stored on computer disks or other computer-readable media for execution in a host or target computer. While an electrical medium has been described as the communications channel, the principles can also be applied using RF, fiber optic, or other media. No claim should be interpreted to be in means plus function format. Numbered steps in method claims should not be interpreted to require a particular ordering of the steps.

The invention claimed is:

1. A computer-readable storage medium having computer-executable instructions when executed by a computer for emulating an Ethernet protocol in a network that uses a non-Ethernet protocol:
  (1) converting a first request to transmit a packet using an Ethernet protocol into a second request to transmit the packet using the non-Ethernet protocol, wherein the conversion is based on a stored mapping between Ethernet and non-Ethernet addresses;
  (2) encapsulating the packet into a second packet compatible with the non-Ethernet protocol;
  (3) transmitting the second packet over the network to a destination node in the network; and
  (4) prior to converting, generating an Ethernet address derived from node addressing information using a digital signature algorithm.

2. The computer-readable storage medium having computer-executable instructions when executed by a computer according to claim 1, wherein generating includes performing an exclusive OR operation between a portion of a digital signature generated by the digital signature algorithm and a stored constant.

3. The computer-readable storage medium having computer-executable instructions when executed by a computer according to claim 1 for, in response to determining that no mapping exists for a particular Ethernet address, transmitting the second packet over a bridge channel that is monitored by a network bridge.

4. The computer-readable storage medium having computer-executable instructions when executed by a computer according to claim 1 for determining whether the generated Ethernet address conflicts with other Ethernet addresses in the network.

5. The computer-readable storage medium having computer-executable instructions when executed by a computer according to claim 4, wherein determining comprises transmitting the generated Ethernet address and the node addressing information to other nodes in the network and evaluating responses from the other nodes.

6. A computer-readable storage medium having computer-executable instructions when executed by a computer for emulating an Ethernet protocol in a network that uses a non-Ethernet protocol, comprising:
   (1) converting a first request to transmit a packet using an Ethernet protocol into a second request to transmit the packet using the non-Ethernet protocol, wherein the conversion is based on a stored mapping between Ethernet and non-Ethernet addresses, the step of converting further including converting the first request to transmit the packet into an IEEE-1394 serial bus request;
   (2) encapsulating the packet into a second packet compatible with the non-Ethernet protocol; and
   (3) transmitting the second packet over the network to a destination node in the network including transmitting the second packet over an asynchronous data channel or an isochronous channel on the serial bus.

7. A computer-readable storage medium having computer-executable instructions when executed by a computer for emulating an Ethernet protocol in a network that uses a non-Ethernet protocol, comprising:
   (1) converting a first request to transmit a packet using an Ethernet protocol into a second request to transmit the packet using the non-Ethernet protocols wherein the conversion is based on a stored mapping between Ethernet and non-Ethernet addresses;
   (2) encapsulating the packet into a second packet compatible with the non-Ethernet protocol;
   (3) transmitting the second packet over the network to a destination node in the network; and
   (4) determining an optimum packet size for use in transmitting packets over the network, wherein the step of determining the optimum packet size is performed by consulting speed topology maps for heterogeneous nodes on the network.

8. The computer-readable storage medium having computer-executable instructions when executed by a computer according to claim 7, wherein the optimum packet size is selected based on a maximum packet size that can be accommodated by any two Ethernet-emulated nodes on the network.

* * * * *